July 31, 1928.  
I. ROLKA  
1,679,270
ANTISKID DEVICE FOR AUTOMOBILES
Filed Sept. 12, 1927   2 Sheets-Sheet 2
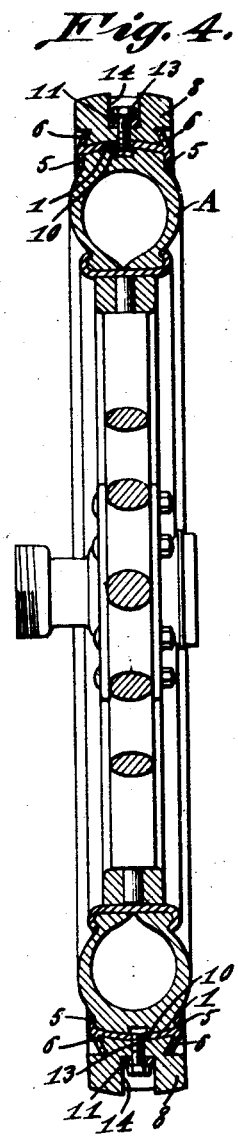
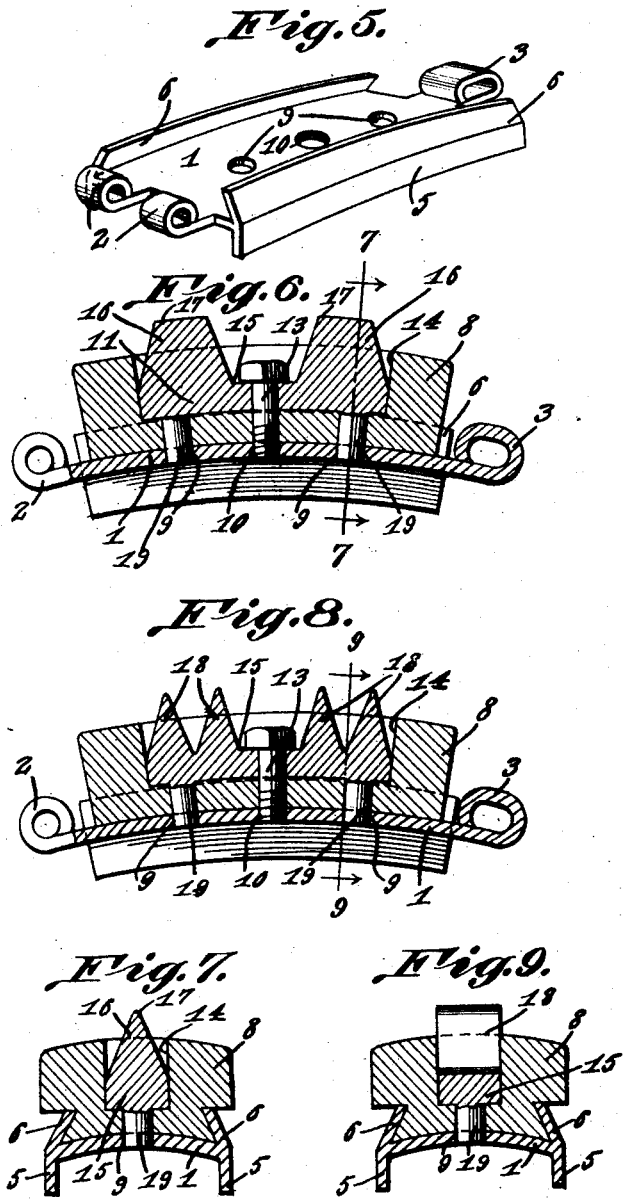

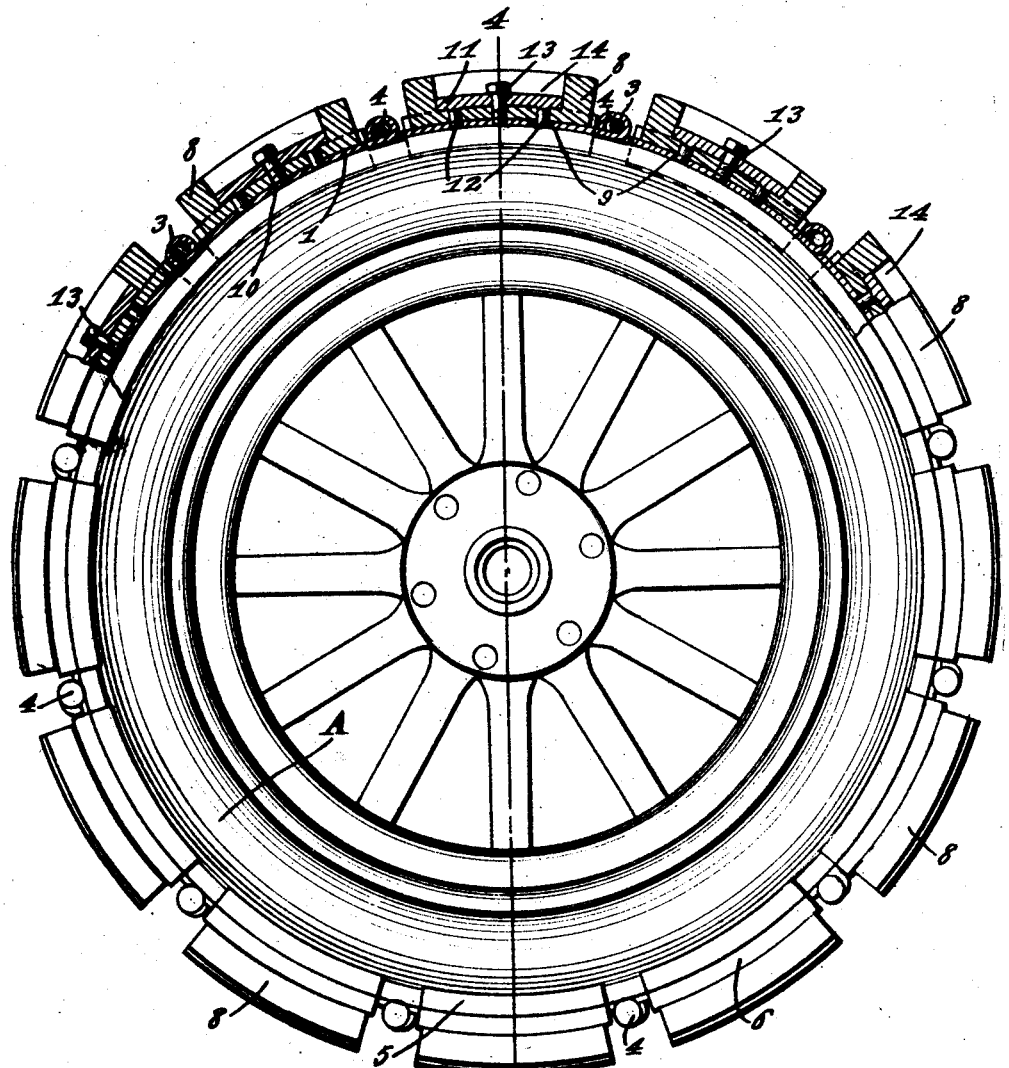
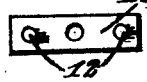

Patented July 31, 1928.

1,679,270

UNITED STATES PATENT OFFICE.

IGNATZ ROLKA, OF GALLITZIN, PENNSYLVANIA.

ANTISKID DEVICE FOR AUTOMOBILES.

Application filed September 12, 1927. Serial No. 219,142.

This invention relates to anti-skid devices for vehicle tires, and its general object is to provide an anti-skid device designed to encircle a tire and be secured to the tread thereof in a manner whereby the device will not only protect the tire tread from punctures and wear, but will prevent skidding and the like on wet and icy surfaces.

A further object of the invention is to provide an anti-skid tread for vehicle tires, that includes a plurality of hingedly secured sections including elastic blocks adapted to receive replaceable metallic members having projections thereon, which are interchangeable with anchor plates, with the result the device can be used, with or without the projection carrying members, it depending upon the road conditions.

Another object of the invention is to provide an anti-skid device for vehicle tires, that is extremely simple in construction, inexpensive to manufacture, and efficient in operation and service.

This invention also consists in certain other features of construction and in the combination and arrangement of the several parts, to be hereinafter fully described, illustrated in the accompanying drawings and specifically pointed out in the appended claims.

In describing my invention in detail, reference will be had to the accompanying drawings wherein like characters denote like or corresponding parts throughout the several views, and in which:

Figure 1 is a side elevation of a vehicle wheel and its tire, with my anti-skid device secured to the tire, and showing the device without the projection carrying members.

Figure 2 is a fragmentary outer plan view of the device.

Figure 3 is an outer plan view of one of the anchor plates.

Figure 4 is a sectional view taken approximately on line 4—4 of Figure 1.

Figure 5 is a perspective view of one of the section base members.

Figure 6 is a longitudinal sectional view of one of the sections complete with one form of projection carrying member secured thereto.

Figure 7 is a sectional view taken approximately on line 7—7 of Figure 6 looking in the direction of the arrows.

Figure 8 is a view similar to Figure 6 showing a slightly modified form of projection carrying member.

Figure 9 is a sectional view taken approximately on line 9—9 of Figure 8, looking in the direction of the arrows.

Referring to the drawings in detail and particularly to Figures 1 to 5 inclusive it will be noted that the anti-skid device which forms the subject matter of the present invention includes a plurality of hingedly connected sections which include base members of similar construction, and these base members are longitudinally curved to follow the circumferential curvature of the tire as best shown in Figure 1 of the drawings and are slightly transversely curved to follow the transverse curvature of the tire as shown in Figure 4 of the drawings. Each of the base members include a body 1 having extending from one end thereof a pair of hinge barrels 2, while extending from the opposite end is a single hinge barrel 3 which is adapted to be arranged between the pair of hinge barrels of the companion section as will be apparent, and disposed in the respective cooperating hinge barrels 2 and 3 are headed pivot pins 4.

The body of each base member has extending inwardly therefrom and from each side edge thereof a flange 5 arranged at right angles to the body, and these flanges are adapted to grip the tread of the tire A for securing the respective sections to the latter as will be readily apparent. Extending outwardly from each of the side edges of the bodies are converging flanges 6 which act as clamps for receiving elastic blocks 8. The blocks are recessed upon opposite sides to provide the dovetail formation as best shown in Figure 4 to receive the flanges 6 which are disposed in gripping engagement therewith.

The body of each section is provided with a pair of openings 9 with an opening 10 of a size larger than the openings 9 disposed between the latter openings as best shown in Figure 5 of the drawings. Cooperating with the flanges 6 for securing the blocks to the base members is an anchor plate 11 which has extending therefrom a pair of studs 12 adapted to be received in the openings 9, while a bolt 13 is passed through an opening formed in the anchor plate and is threadedly secured in the openings 10. The blocks are provided with recesses 14 to receive the anchor plates as best shown in Figure 1 of the drawings.

In Figures 5 to 9 inclusive, I have illustrated projection members which are used in the place of the anchor plates when desired, and each of these projection members include a body 15 adapted to be received in the recesses 14 of the blocks and in the form of the projection member as shown in Figures 6 and 7, it will be noted that the body 15 has extending therefrom upon opposite sides of an opening to accommodate the bolt 13, a single projection 16, and these projections 16 are provided with sharp outer surfaces 17. In Figures 8 and 9, the projections which are indicated by the reference numeral 18 are arranged in pairs upon opposite sides of the bolt receiving opening and the projections in this form of the invention are substantially V-shaped in cross section as shown. Each of the bodies of the projection carrying members have extending therefrom studs 19 to be passed through the blocks and received in the openings 9 of the body 1 of the base members, and the bolts 13 are adapted to be passed through the openings of the projection carrying members for securing the same to the body 1. By this construction, it will be apparent that the projection carrying members act in the same capacity as the anchor plates for the purpose of securing the blocks to the bodies of the base members, but the projections of course are adapted for the purpose of preventing skidding and the like in packed snow, ice and mud, while when the device is provided with the anchor plates as shown in Figure 1, it will prevent skidding on slippery streets as well as the surfaces above mentioned.

From the above description and disclosure of the drawings, it will be obvious that I have provided an anti-skid device which includes interchangeable members to suit existing conditions, and the projection carrying members can be substituted for the anchor plates, and vice versa as desired.

The sections may be secured together at any distance apart, it depending of course upon the size and length of the hinge barrels 2 and 3, and in order to prevent squeaking and premature wear of the pins and hinge barrels, it will be obvious that lubricant can be applied thereto.

It is thought from the foregoing description that the advantages and novel features of my invention will be readily apparent.

I desire it to be understood that I may make changes in the construction and in the combination and arrangement of the several parts, provided that such changes fall within the scope of the appended claims.

What I claim is:

1. An anti-skid device of the character described comprising a plurality of sections hingedly secured together to encircle a vehicle tire, a base member included in each section, a recessed elastic block for each base section, projection carrying means arranged in the recesses of the blocks, and means for securing the projection carrying members and blocks respectively to the base members thereof.

2. An anti-skid device of the character described comprising a plurality of sections hingedly secured together to encircle a vehicle tire, a base member included in each section, a recessed elastic block for each base member, interchangeable means including anchor plates and projection carrying members adapted to be arranged in the recesses of the blocks, and means for securing either of the first mentioned means and blocks respectively to the base members thereof.

In testimony whereof I affix my signature.

IGNATZ ROLKA.